United States Patent
Kim et al.

(10) Patent No.: US 11,296,325 B2
(45) Date of Patent: *Apr. 5, 2022

(54) ELECTRODE FOR SECONDARY BATTERY INCLUDING ELECTRODE PROTECTING LAYER

(71) Applicant: LG Chem, Ltd., Seoul (KR)

(72) Inventors: Jeong Gil Kim, Daejeon (KR); Hyo Sik Kim, Daejeon (KR); Jeong Ho Ha, Daejeon (KR); Ji Eun Lee, Daejeon (KR); Sol Nip Lee, Daejeon (KR)

(73) Assignee: LG Energy Solution, Ltd.

( * ) Notice: Subject to any disclaimer, the term of this patent is extended or adjusted under 35 U.S.C. 154(b) by 107 days.

This patent is subject to a terminal disclaimer.

(21) Appl. No.: 16/070,979

(22) PCT Filed: Aug. 21, 2017

(86) PCT No.: PCT/KR2017/009080
§ 371 (c)(1),
(2) Date: Jul. 18, 2018

(87) PCT Pub. No.: WO2018/097455
PCT Pub. Date: May 31, 2018

(65) Prior Publication Data
US 2019/0020036 A1 Jan. 17, 2019

(30) Foreign Application Priority Data
Nov. 24, 2016 (KR) .................. 10-2016-0157137

(51) Int. Cl.
*H01M 4/62* (2006.01)
*H01M 2/26* (2006.01)
(Continued)

(52) U.S. Cl.
CPC ............. *H01M 4/628* (2013.01); *H01M 4/13* (2013.01); *H01M 4/366* (2013.01); *H01M 10/4235* (2013.01); *H01M 50/531* (2021.01)

(58) Field of Classification Search
None
See application file for complete search history.

(56) References Cited

U.S. PATENT DOCUMENTS

| 8,703,343 B2 | 4/2014 | Ikeda | |
| 2008/0102370 A1* | 5/2008 | Kashiwagi | H01M 4/134 |
| | | | 429/218.1 |

(Continued)

FOREIGN PATENT DOCUMENTS

| EP | 2819221 A1 | 12/2014 |
| JP | 2008117574 A | 5/2008 |

(Continued)

OTHER PUBLICATIONS

Partial European Search Report including Written Opinion for Application No. 17873084.2 dated May 2, 2019, 15 pages.

(Continued)

*Primary Examiner* — Zhongqing Wei
(74) *Attorney, Agent, or Firm* — Lerner, David, Littenberg, Krumholz & Mentlik, LLP

(57) ABSTRACT

The present disclosure provides an electrode for a secondary battery including a current collector having an electrode tab protruding outward to at least one outer peripheral side thereof, an electrode mixture layer formed on the current collector, and an electrode protecting layer applied on the electrode mixture layer, wherein the electrode protecting layer includes a conductive material and a binder to supplement conductivity of the electrode mixture layer and prevent separation of the electrode mixture layer from the current collector.

13 Claims, 2 Drawing Sheets

(51) Int. Cl.
*H01M 4/36* (2006.01)
*H01M 10/42* (2006.01)
*H01M 4/13* (2010.01)
*H01M 50/531* (2021.01)

(56) References Cited

U.S. PATENT DOCUMENTS

| | | | |
|---|---|---|---|
| 2013/0022867 A1* | 1/2013 | Suzuki | H01M 4/13 429/211 |
| 2014/0023919 A1 | 1/2014 | Minami et al. | |
| 2014/0120408 A1* | 5/2014 | Kim | H01M 50/46 429/162 |
| 2014/0227583 A1* | 8/2014 | Do | H01M 10/0431 429/162 |
| 2014/0376160 A1 | 12/2014 | Kako et al. | |
| 2015/0010784 A1 | 1/2015 | Takahata et al. | |
| 2016/0126555 A1 | 5/2016 | Kwon et al. | |
| 2016/0190566 A1 | 6/2016 | Shiozaki et al. | |
| 2017/0117551 A1 | 4/2017 | Choi et al. | |
| 2018/0006291 A1 | 1/2018 | Kim et al. | |

FOREIGN PATENT DOCUMENTS

| | | | |
|---|---|---|---|
| JP | 2011216242 A | | 10/2011 |
| JP | 5403153 B2 | | 1/2014 |
| JP | 2014203771 A | | 10/2014 |
| KR | 20130136131 A | | 12/2013 |
| KR | 20140127883 A | | 11/2014 |
| KR | 20160002252 A | | 1/2016 |
| KR | 20160069385 A | | 6/2016 |
| KR | 20160091732 A | * | 8/2016 |
| KR | 20160091732 A | | 8/2016 |
| KR | 20160111673 A | | 9/2016 |

OTHER PUBLICATIONS

Search report from International Application No. PCT/KR2017/009080, dated Dec. 12, 2017.
Extended European Search Report for Application No. EP17873084.2, dated Aug. 12, 2019, pp. 1-5.

* cited by examiner

300

ELECTRODE FOR SECONDARY BATTERY INCLUDING ELECTRODE PROTECTING LAYER

CROSS-REFERENCE TO RELATED APPLICATION

This application is a national phase entry under 35 U.S.C. 371 of International Application No. PCT/KR2017/009080, filed on Aug. 21, 2017 which claims priority to Korean Patent Application No. 10-2016-0157137, filed on Nov. 24, 2016, the disclosures of which are incorporated herein by reference in their entirety.

TECHNICAL FIELD

The present disclosure relates to an electrode for a secondary battery including an electrode protecting layer.

BACKGROUND ART

Recently, the price of an energy source has risen due to the depletion of fossil fuels and interest in environmental pollution has been amplified, and thus the demand for environmentally-friendly alternative energy sources has become an essential factor for future life. Accordingly, researches into various power production technologies such as nuclear power production technology, solar power production technology, wind power production technology, tidal power production technology, and the like have been continuing, and great interest in power storage devices for more efficient use of the energy produced through such technologies has also been continuing.

In particular, as technical development of and the demand on mobile devices have been increased, the demand on a battery as an energy source has been rapidly increased, and a lot of research has been conducted on a battery that can meet various demands.

Typically, in terms of a shape of the battery, there is a high demand for a prismatic type secondary battery and a pouch-type secondary battery that can be applied to products such as mobile phones having a thin thickness, and in terms of materials of the battery, there is a high demand for lithium secondary batteries such as lithium ion batteries and lithium ion polymer batteries having advantages such as high energy density, discharge voltage, output stability, and the like.

Further, the secondary battery may be classified according to a structure of an electrode assembly having a structure in which a positive electrode, a negative electrode, and a separator interposed between the positive electrode and the negative electrode are laminated. Typical examples are a jelly-roll type (wound type) electrode assembly having a structure in which long sheet-like positive electrodes and negative electrodes are wound with a separator interposed therebetween, and a stack type (laminated type) electrode assembly in which a large number of positive electrodes and negative electrodes cut in units of a predetermined size are sequentially laminated with a separator interposed therebetween. Recently, in order to solve problems of the jelly-roll type electrode assembly and the stack type electrode assembly, as an electrode assembly having an advanced structure that is a mixed type of the jelly-roll type and the stack type, a stacked/folded type electrode assembly having a structure in which unit cells in which a predetermined unit of positive electrodes and negative electrodes are laminated with a separator interposed therebetween, are positioned on the separator, and are sequentially wound has been developed.

The secondary battery is classified into a cylindrical type battery and a prismatic type battery in which an electrode assembly is housed in a cylindrical or prismatic metal can according to a shape of a battery case, and a pouch type battery in which an electrode assembly is embedded in a pouch shaped case made of an aluminum laminate sheet.

Generally, such an electrode for a secondary battery is manufactured by applying an electrode mixture slurry obtained by mixing an electrode active material, a conductive material, and a binder on a current collector and drying the electrode mixture slurry to form an electrode mixture layer.

However, in the secondary battery including these electrodes, as charging and discharging progress, a change in volume of the electrode occurs, the electrode mixture layer is separated from the current collector according to the change, and as a result, it is difficult to transfer electrons between the electrode material mixture layer and the current collector, which results in an increased internal resistance. Furthermore, as a charge/discharge cycle of the secondary battery progresses, capacity and lifespan characteristics are drastically reduced.

In particular, recently, in order to construct a secondary battery with a high energy density, a loading amount of the electrode mixture layer is increased, and as the loading amount of the electrode mixture layer increases, the above-mentioned problem caused by a decrease in an adhesive force between the electrode mixture layer and the current collector becomes more serious.

Therefore, there is a great need for a technology that can fundamentally solve such problems.

DISCLOSURE

Technical Problem

The present disclosure is provided to solve the above-described problems of the related art and technical problems which have been identified in the past.

The inventors of the present application have conducted intense research and various experiments, and as will be described below, an electrode protecting layer, which includes a conductive material and a binder, is applied on an electrode mixture layer so that the electrode protecting layer prevents separation of the electrode mixture layer from a current collector, and thus an increase in internal resistance that may occur between the electrode mixture layer and the current collector and deterioration of capacity and lifespan characteristics due to the resistance increase may be prevented. Even when separation of the electrode mixture layer locally occurs, the electrode protecting layer forms a conductive network between the electrode mixture layer and the current collector, and thus movement of electrons between the electrode mixture layer and the current collector may be smoothly performed. Accordingly, it has been confirmed that performance deterioration of the secondary battery, which may occur due to an increase in internal resistance caused by separation of the electrode mixture layer, may be effectively prevented. Thus, the present disclosure has been completed.

Technical Solution

The present disclosure provides an electrode for a secondary battery including a current collector having an electrode tab protruding outward to at least one outer peripheral side thereof, an electrode mixture layer formed on the current collector, and an electrode protecting layer applied on the electrode mixture layer, wherein the electrode protecting layer includes a conductive material and a binder to supplement conductivity of the electrode mixture layer and prevent separation of the electrode mixture layer from the current collector.

The electrode protecting layer may prevent separation of the electrode mixture layer from the current collector, and thus an increase in internal resistance that may occur between the electrode mixture layer and the current collector and deterioration of capacity and lifespan characteristics due to the resistance increase may be prevented. Even when separation of the electrode mixture layer locally occurs, the electrode protecting layer may form a conductive network between the electrode mixture layer and the current collector, and thus movement of electrons between the electrode mixture layer and the current collector may be smoothly performed. Accordingly, it can be confirmed that performance deterioration of the secondary battery which may occur due to an increase in internal resistance caused by separation of the electrode mixture layer may be effectively prevented.

In one specific example, the electrode mixture layer may include a non-coated portion, and the non-coated portion is a portion at which the electrode mixture layer is not formed at an outer peripheral portion of the electrode mixture layer on the current collector.

The electrode mixture layer may be formed at a central portion of the current collector to form the non-coated portion on the outer peripheral portion.

The electrode protecting layer may be applied in a continuous shape adhered to the non-coated portion of the current collector while wrapping around an outer surface of the electrode mixture layer.

The electrode protecting layer may be adhered to the non-coated portion of the current collector so that an adhesion state of the electrode mixture layer to the current collector may be stably maintained. In addition, since the electrode protecting layer adhered to the current collector face the electrode mixture layer, a conductive network may be formed between the current collector and the electrode mixture layer even when the electrode mixture layer is locally removed, thereby preventing a decrease in electron mobility. Therefore, it may be possible to effectively prevent an increase in internal resistance and deterioration of capacity and lifespan characteristics due to the decrease in electron mobility.

An area of the electrode protecting layer adhered to the non-coated portion may be in a range of 1% to 5% of an area of the current collector portion in contact with the electrode mixture layer, and may be 30% to 100% of the total area of the non-coated portion excluding the electrode tab.

When the area of the electrode protecting layer adhered to the non-coated portion is excessively small outside the above range, the adhesion state of the electrode mixture layer may not be stably maintained or the conductive network may not be suitably formed to stably ensure mobility of electrons between the current collector and the electrode mixture layer.

When the area of the electrode protecting layer adhered to the non-coated portion is excessively large beyond the above range, which is a case in which a contact area of the electrode protecting layer with respect to the current collector is excessively large, an area of the electrode mixture layer is relatively reduced in a limited current collector space so that the overall capacity of the secondary battery may be relatively smaller than that of a secondary battery having the same size.

A mixing ratio of the conductive material and the binder in the electrode protecting layer may be 95:5 to 85:15 by weight.

When the ratio of the conductive material is excessively small or the ratio of the binder is excessively large outside the above range in the electrode protecting layer, mobility of electrons between the electrode mixture layer and the current collector through the electrode protecting layer may be decreased.

When the ratio of the conductive material is excessively large or the ratio of the binder is excessively small outside the above range in the electrode protecting layer, an adhesive force of the electrode protecting layer relative to the current collector may be lowered, and thus separation of the electrode mixture layer may not be effectively prevented.

In one specific example, a thickness of the electrode protecting layer may be 0.5% to 5% of a thickness of the electrode mixture layer.

When the thickness of the electrode protecting layer is less than 0.5% of the thickness of the electrode mixture layer, which is a case in which the thickness of the electrode protecting layer is excessively thin, an effect to be exhibited through the electrode protecting layer may not be sufficiently achieved.

When the thickness of the electrode protecting layer exceeds 5% of the thickness of the electrode mixture layer, which is a case in which the thickness of the electrode protecting layer is excessively thick, a loading amount of the electrode mixture layer may be relatively smaller than that of a secondary battery having the same thickness, and thus the capacity thereof may be lowered.

In one specific example, the thickness of the electrode protecting layer may be continuously or discontinuously thickened corresponding to a separation distance from the electrode tab.

As a portion is farther from the electrode tab, the mobility of electrons may be relatively decreased in comparison to a portion adjacent to the electrode tab. And considering a recent tendency in which an area of an electrode for a secondary battery is increasing, this problem may become more increased.

The electrode for a secondary battery according to the present disclosure has a thick structure corresponding to a separation distance between the electrode protecting layer and the electrode tab, and thus it is possible to effectively prevent a decrease in the mobility of electrons between the electrode mixture layer and the current collector even in a portion at a great separation distance from the electrode tab.

A thickness of the electrode protecting layer on the electrode mixture layer at the maximum separation distance from the electrode tab may be in a range of 101% to 110% with respect to a thickness of the electrode protecting layer on the electrode mixture layer at the minimum distance from the electrode tab.

When the thickness of the electrode protecting layer on the electrode mixture layer at the maximum separation distance from the electrode tab is excessively thin beyond the above range, the effect to be exhibited through the thickness difference may not be sufficiently achieved.

When the thickness of the electrode protecting layer on the electrode mixture layer at the maximum separation distance from the electrode tab is excessively thick beyond the above range, a mounting space of a device to which the secondary battery including the electrode is applied may be restricted due to the inclined structure formed on the vertical section, from the portion that is the closest to the electrode tab to the portion that is the maximum separation distance from the electrode tab. In order to prevent this, when the thickness of the electrode mixture layer is different according to the separation distance from the electrode tab, the thickness of the electrode mixture layer may be relatively thinned at the maximum separation distance from the electrode tab, thereby lowering the capacity of the secondary battery.

In one specific example, the thickness of the electrode protecting layer may be uniform on all electrode material mixture layers.

A content of the conductive material contained in the electrode protecting layer may increase continuously or discontinuously as the distance from the electrode tab increases.

There may be a problem in that, as the portion is farther from the electrode tab, the mobility of electrons may be decreased.

The content of the conductive material contained in the electrode protecting layer may increase continuously or discontinuously as the distance from the electrode tab increases, and thus it may be possible to effectively prevent a decrease in the mobility of electrons between the electrode mixture layer and the current collector even in a portion at a far distance from the electrode tab.

A content of the conductive material at a portion of the electrode protecting layer at the maximum separation distance from the electrode tab may be 101% to 110% of a content of the conductive material at a portion of the electrode protecting layer at the minimum distance from the electrode tab.

When the content of the conductive material at the portion of the electrode protecting layer at the maximum separation distance from the electrode tab is excessively small outside the above range, a desired effect to be exhibited through the above configuration may not be sufficiently achieved.

When the content of the conductive material at the portion of the electrode protecting layer at the maximum separation distance from the electrode tab is excessively large beyond the above range, which is a case in which the content of the conductive material is too high, the content of the binder in the electrode protecting layer may rather be reduced. Therefore, the adhesive force to the current collector may not be sufficiently exhibited at the portion of the electrode protecting layer at the maximum separation distance from the electrode tab.

In the electrode protecting layer, a thickness at a portion adhered to the non-coated portion of the current collector may be from 101% to 110% of a thickness at a portion applied on the electrode mixture layer.

In the electrode protecting layer, a content of the binder at a portion adhered to the non-coated portion of the current collector may be from 101% to 110% of a content of the binder at a portion applied on the electrode mixture layer.

The electrode protecting layer may be applied in a continuous shape adhered to the non-coated portion of the current collector while wrapping around the outer surface of the electrode mixture layer, thereby exhibiting a desired effect.

The electrode protecting layer may have a structure in which the thickness of the portion adhered to the non-coated portion is relatively thick in comparison to the thickness of the portion applied on the electrode mixture layer, or a structure in which the content of the binder of the portion adhered to the non-coated portion is relatively high in comparison to the content of the binder of the portion applied on the electrode mixture layer. Therefore, the content of the binder in the electrode protecting layer portion adhered to the non-coated portion is relatively high, and thus a more stable adhesive force relative to the current collector is exhibited, and the separation of the electrode mixture layer may be prevented more effectively.

Since the remaining configuration of the secondary battery electrode except for the above structure or configuration is known in the art, a detailed description thereof will be omitted in this specification.

Advantageous Effects

As described above, an electrode for a secondary battery according to the present disclosure is configured such that an electrode protecting layer including a conductive material and a binder is applied on an electrode mixture layer so that the electrode protecting layer prevents separation of the electrode mixture layer from a current collector, and thus an increase in internal resistance that may occur between the electrode mixture layer and the current collector and deterioration of capacity and lifespan characteristics due to the resistance increase can be prevented. Even when separation of the electrode mixture layer locally occurs, the electrode protecting layer forms a conductive network between the electrode mixture layer and the current collector, and thus movement of electrons between the electrode mixture layer and the current collector can be smoothly performed. Accordingly, it has been confirmed that performance deterioration of the secondary battery which may occur due to an increase in internal resistance caused by separation of the electrode mixture layer can be effectively prevented.

DETAILED DESCRIPTION OF THE PREFERRED EMBODIMENTS

Hereinafter, exemplary embodiments of the disclosure will be described in detail with reference to the drawings, and the scope of the present disclosure is not limited thereto.

Figure 1:
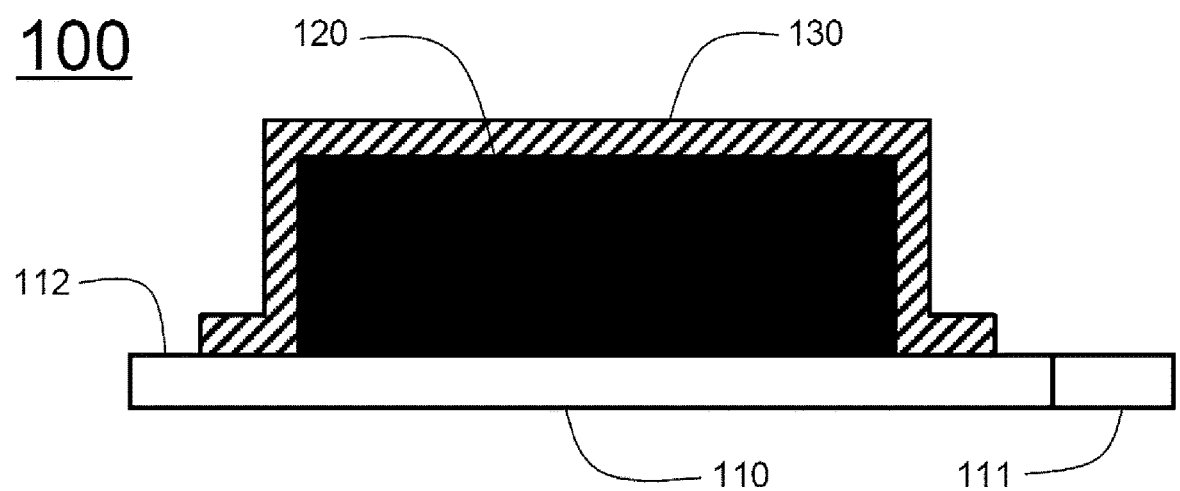
FIG. 1 is a schematic diagram showing a cross-sectional structure of an electrode for a secondary battery according to one embodiment of the present disclosure.

FIG. 1 is a schematic diagram showing a cross-sectional structure of an electrode for a secondary battery according to one embodiment of the present disclosure.

Referring to FIG. 1, an electrode 100 for a secondary battery includes a current collector 110, an electrode mixture layer 120, and an electrode protecting layer 130.

An electrode tab 111 protrudes outward on one outer peripheral side of the current collector 110.

The electrode mixture layer 120 is formed in a central portion of the current collector 110 so that a non-coated portion 112, which is a portion at which the electrode mixture layer 120 is not formed, is formed at an outer peripheral portion of the electrode mixture layer 120.

The electrode protecting layer 130 is applied on the electrode mixture layer 120. Specifically, the electrode protecting layer 130 is applied in a continuous shape adhered to the non-coated portion 112 of the current collector 110 while wrapping around an outer surface of the electrode mixture layer 120.

Therefore, the electrode mixture layer 120 is stably bonded to the current collector 110 by the electrode protecting layer 130 being adhered to the current collector 110 on the non-coated portion 112 of the outer peripheral portion, thereby effectively preventing separation of the electrode mixture layer 120 from the current collector 110.

Figure 2:
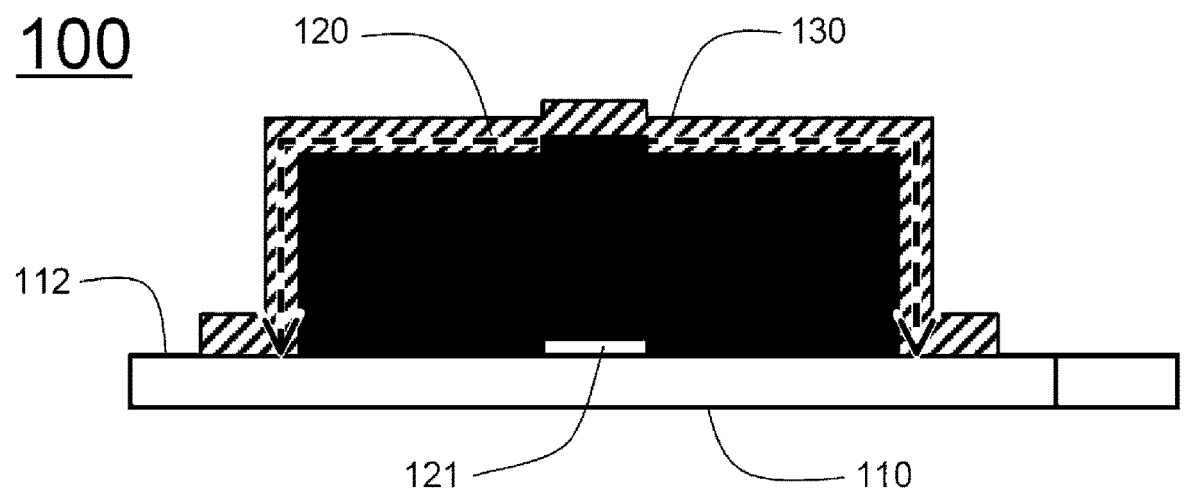
FIG. 2 is a schematic diagram showing a cross-sectional structure in a case in which an electrode mixture layer of FIG. 1 is locally separated.

FIG. 2 is a schematic diagram showing a cross-sectional structure in a case in which the electrode mixture layer of FIG. 1 is locally separated.

Referring to FIG. 2, the center portion of the electrode mixture layer 120 has a structure that does not come into direct contact with the current collector 110 due to being partially separated from the current collector 110.

However, since the electrode protecting layer 130 applied on the electrode mixture layer 120 is adhered to the non-coated portion 112 of the current collector 110, a conductive network is formed between the electrode mixture layer 120 and the current collector 110, and thus electrons may move between the electrode mixture layer 120 and the current collector 110 through the electrode protecting layer 130.

Accordingly, despite the local separation of the electrode mixture layer 120, a decrease in electron mobility and an increase in internal resistance between the electrode mixture layer 120 and the current collector 110 may be prevented, thereby preventing deterioration in capacity and lifespan characteristics.

Figure 3:
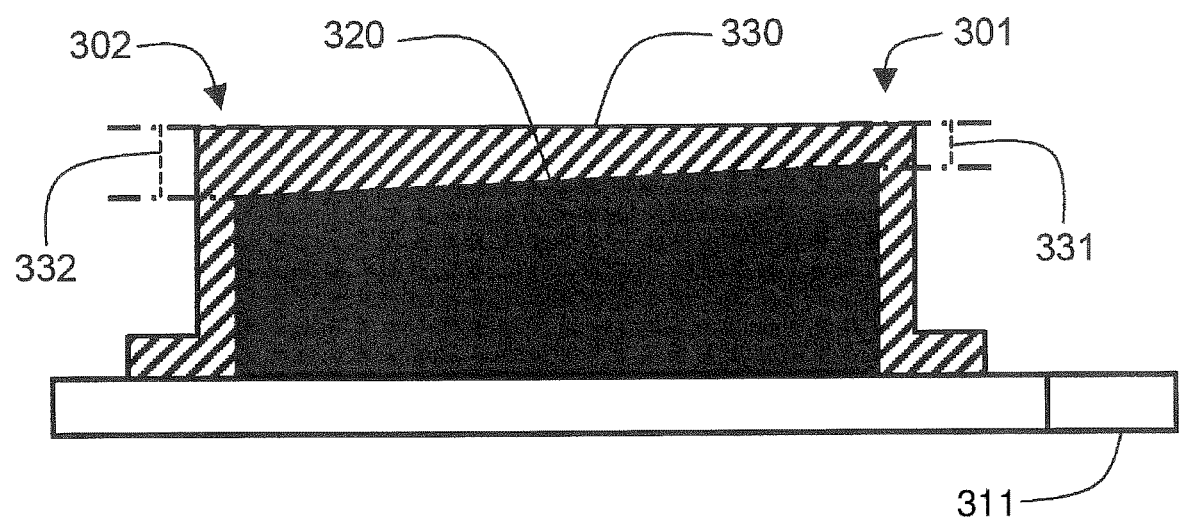
FIG. 3 is a schematic diagram showing a cross-sectional structure of an electrode for a secondary battery according to another embodiment of the present disclosure.

FIG. 3 is a schematic diagram showing a cross-sectional structure of an electrode for a secondary battery according to another embodiment of the present disclosure.

Referring to FIG. 3, an electrode protecting layer 330 has a structure that is continuously thickened from a portion 301 closest to an electrode tab 311 to a portion 302 farthest from the electrode tab 311. Correspondingly, an electrode mixture layer 320 has structure that is continuously thinned from the portion 301 closest to the electrode tab 311 to the portion 302 farthest from the electrode tab 311.

Accordingly, since a thickness 332 of the electrode protecting layer 330 of the portion 302 farthest from the electrode tab 311 is configured to be relatively thick in comparison to a thickness 331 of the electrode protecting layer 330 of the portion 301 closest to the electrode tab 311, a content of conductive material contained in the electrode protecting layer 330 is relatively increased, and thus a decrease in the mobility of electrons from the portion 302 farthest from the electrode tab 311 and deterioration of lifespan characteristics due to the decrease of mobility may be effectively prevented.

The remaining structure of an electrode 300 for a secondary battery excluding the above structure is the same as that of the electrode of FIG. 1, and thus a detailed description thereof will be omitted.

Hereinafter, the present disclosure will be described in detail with reference to examples of the present disclosure, but the scope of the present disclosure is not limited thereto.

Example 1

A positive electrode active material, a PVdF binder, and a natural graphite conductive material were mixed well with NMP at a weight ratio of 96:2:2 (positive electrode active material:binder:conductive material), and then applied to an Al foil having a thickness of 20 μm to form a non-coated portion around an outer periphery thereof, which resulted in an electrode mixture layer being formed. The natural graphite conductive material and the PVdF binder were mixed well with NMP to have a weight ratio of 95:5 (conductive material:binder), and then the mixture was applied in a continuous shape in contact with the non-coated portion of a current collector while wrapping around an outer surface of an positive electrode mixture layer to form a positive electrode protecting layer, and dried at 130° C. to prepare a positive electrode.

Example 2

The same positive electrode as that of Example 1 was prepared except that the natural graphite conductive material and the PVdF binder forming the positive electrode protecting layer were mixed at a weight ratio of 90:10 (conductive material:binder).

Example 3

The same positive electrode as that of Example 1 was prepared except that the natural graphite conductive material and the PVdF binder forming the positive electrode protecting layer were mixed at a weight ratio of 85:15 (conductive material:binder).

Comparative Example 1

The same positive electrode as that of Example 1 was prepared except that the positive electrode protecting layer was not formed.

Comparative Example 2

The same positive electrode as that of Example 1 was prepared except that the natural graphite conductive material and the PVdF binder forming the positive electrode protecting layer were mixed at a weight ratio of 98:2 (conductive material:binder).

Comparative Example 3

The same positive electrode as that of Example 1 was prepared except that the natural graphite conductive material and the PVdF binder forming the positive electrode protecting layer were mixed at a weight ratio of 80:20 (conductive material:binder).

Preparation of Secondary Battery

The positive electrodes prepared in Examples 1 to 3 and Comparative Examples 1 to 3, a lithium foil as a negative electrode, and an electrolyte containing 1 M $LiPF_6$ in a solvent having EC:DMC:DEC=1:2:1 were used to prepare half coin cells.

Experimental Example 1

Lifespan Characteristics Analysis

The half coins prepared above were charged at 0.5 C to an upper limit voltage of 4.50 V at 25° C., and discharged back down to a lower limit voltage 3 V at 1.0 C, which is defined as one cycle, a capacity retention rate of 100 cycles was measured, and the measurement results are shown in Table 1.

TABLE 1

| | Remaining Capacity After One Cycle (mAh/cm2) | Remaining Capacity After 100 Cycles (mAh/cm2) | Capacity Retention Rate After 100 cycles (%) |
|---|---|---|---|
| Example 1 | 5.20 | 4.65 | 89.5 |
| Example 2 | 5.19 | 4.71 | 90.8 |
| Example 3 | 5.20 | 4.74 | 91.2 |
| Comparative Example 1 | 5.16 | 3.68 | 71.4 |
| Comparative Example 2 | 5.18 | 3.90 | 75.2 |
| Comparative Example 3 | 5.22 | 3.85 | 73.8 |

Referring to Table 1, it can be seen that, in the case of Examples 1 to 3 including the electrode protecting layer, an excellent capacity retention rate is exhibited in comparison with Comparative Example 1 which did not include the electrode protecting layer.

Further, it can be seen that Examples 1 to 3, in which the conductive material and the binder forming the electrode protecting layer were included in a desired range, exhibit an excellent capacity retention rate in comparison to Comparative Examples 2 and 3 in which the conductive material and the binder of the electrode protecting layer were included at a ratio outside the above range.

That is, an electrode protecting layer containing the conductive material and the binder within a desired range increases an adhesion force of an electrode mixture layer relative to a current collector, thereby preventing separation of the electrode mixture layer from the current collector. In addition, even when local separation of the electrode mixture layer occurs, the electrode protecting layer sufficiently containing the conductive material forms a conductive network, thereby preventing a decrease in mobility of electrons between the electrode mixture layer and the current collector. By doing so, it can be seen that deterioration of lifespan characteristics may be prevented despite the local separation of the electrode mixture layer.

Although the present disclosure has been described with reference to the accompanying drawings and embodiments thereof, it should be understood by those skilled in the art that various changes may be made without departing from the spirit and scope of the present disclosure.

The invention claimed is:

1. An electrode for a secondary battery comprising:
a current collector consisting of a central portion and a non-coated portion, wherein the non-coated portion is disposed around the outer periphery of the central portion and extends from the central portion to an outer peripheral side of the current collector;
an electrode tab protruding outward from the outer peripheral side thereof;
an electrode mixture layer formed on the central portion of the current collector, wherein the central portion is the portion of the current collector on which the electrode mixture layer is formed, wherein the electrode mixture layer entirely covers the central portion, and wherein the non-coated portion is the portion of the current collector on which the electrode mixture layer is not formed, the non-coated portion being at an outer peripheral portion of the electrode mixture layer; and
an electrode protecting layer applied on the electrode mixture layer and adhering to the non-coated portion, wherein the electrode protecting layer consists of a conductive material and a binder to supplement conductivity of the electrode mixture layer and prevent separation of the electrode mixture layer from the current collector.

2. The electrode of claim 1, wherein the electrode protecting layer has a continuous shape, which adheres to the non-coated portion of the current collector while wrapping around an outer surface of the electrode mixture layer.

3. The electrode of claim 2, wherein an area of the electrode protecting layer adhered to the non-coated portion is in a range of 1% to 5% of an area of the current collector portion in contact with the electrode mixture layer.

4. The electrode of claim 2, wherein an area of the electrode protecting layer adhered to the non-coated portion is 30% to 100% of a total area of the non-coated portion excluding the electrode tab.

5. The electrode of claim 1, wherein a mixing ratio of the conductive material and the binder in the electrode protecting layer is 95:5 to 85:15 by weight.

6. The electrode of claim 1, wherein a thickness of the electrode protecting layer is 0.5% to 5% with respect to a thickness of the electrode mixture layer.

7. The electrode of claim 1, wherein a thickness of the electrode protecting layer is continuously or discontinuously thickened corresponding to a separation distance from the electrode tab.

8. The electrode of claim 7, wherein a thickness of the electrode protecting layer on the electrode mixture layer at the maximum separation distance from the electrode tab is in a range of 101% to 110% of a thickness of the electrode protecting layer on the electrode mixture layer at the minimum distance from the electrode tab.

9. The electrode of the claim 1, wherein a thickness of the electrode protecting layer is uniform on the electrode material mixture layer.

10. The electrode of claim 9, wherein a content of the conductive material contained in the electrode protecting layer increases continuously or discontinuously as a separation distance from the electrode tab increases.

11. The electrodes of claim 10, wherein a content of the conductive material at a portion of the electrode protecting layer at the maximum separation distance from the electrode tab is 101% to 110% of a content of the conductive material at a portion of the electrode protecting layer at the minimum distance from the electrode tab.

12. The electrode of claim 1, wherein the electrode protecting layer having a portion applied on the electrode mixture layer and a portion adhering to the non-coated portion of the current collector, wherein a thickness at the portion adhered to the non-coated portion of the current collector is from 101% to 110% of a thickness at the portion applied on the electrode mixture layer.

13. The electrode of claim 1, wherein the electrode protecting layer having a portion applied on the electrode mixture layer and a portion adhering to the non-coated portion of the current collector, wherein a weight percentage of the binder at the portion adhered to the non-coated portion of the current collector is from 101% to 110% greater than a weight percentage of the binder at the portion applied on the electrode mixture layer.

* * * * *